United States Patent [19]

Song et al.

[11] Patent Number: 5,419,919
[45] Date of Patent: May 30, 1995

[54] CONTINUOUS GUM BASE MANUFACTURE USING PADDLE MIXING

[75] Inventors: Joo H. Song, Northbrook; Donald J. Townsend, Chicago, both of Ill.

[73] Assignee: Wm. Wrigley Jr. Company, Chicago, Ill.

[21] Appl. No.: 141,281

[22] Filed: Oct. 22, 1993

[51] Int. Cl.⁶ .............................................. A23G 3/30
[52] U.S. Cl. ........................................ 426/5; 426/516; 264/211; 425/204; 425/208
[58] Field of Search ................................. 426/3-6, 426/516; 425/204, 208; 264/211

[56] References Cited

U.S. PATENT DOCUMENTS

| | | | |
|---|---|---|---|
| 3,995,064 | 11/1976 | Ehrgott et al. | 426/3 |
| 4,068,004 | 1/1978 | Carlin et al. | 426/3 |
| 4,187,320 | 2/1980 | Koch et al. | 426/3 |
| 4,208,431 | 6/1980 | Friello et al. | 426/3 |
| 4,217,368 | 8/1980 | Witzel et al. | 426/5 |
| 4,305,962 | 12/1981 | del Angel | 426/3 |
| 4,459,311 | 7/1984 | DeTora et al. | 426/3 |
| 4,555,407 | 11/1985 | Kramer et al. | 426/5 |
| 4,876,095 | 10/1989 | Yang | 426/3 |
| 4,968,511 | 11/1990 | D'Amelia et al. | 426/6 |
| 5,045,325 | 9/1991 | Lesko et al. | 426/5 |
| 5,059,103 | 10/1991 | Bruckmann et al. | 425/67 |
| 5,135,760 | 8/1992 | Degady et al. | 426/5 |

FOREIGN PATENT DOCUMENTS

| | | | |
|---|---|---|---|
| 0273809 | 7/1988 | European Pat. Off. | A23G 3/30 |
| 2635441 | 2/1990 | France | A23G 3/30 |
| 1538785 | 1/1979 | United Kingdom | C08J 3/20 |

OTHER PUBLICATIONS

Brochure: "The Teledyne Readco Continuous Processor", by Teledyne Readco, York, Pa. (date unknown).
Brochure: "Leistritz Extrusionstechnik—The Multi-Extrusion System", by Leistritz (date unknown).
Brochure: "Leistritz Extrusionstechnik—The Universal Laboratory Extruder System", by Leistritz (date unknown).
Brochure: "D-Tex Continuous Compounding Twin Screw Extruders", by Davis-Standard (date unknown).

*Primary Examiner*—Jeanette Hunter
*Attorney, Agent, or Firm*—Maxwell J. Petersen; Willian Brinks Hofer Gilson & Lione

[57] ABSTRACT

A method of continuously making chewing gum base employs low pressure, adequate residence time, and the flexibility of selectively feeding different ingredients at different locations on the mixer. The method involves the use of a paddle mixer, characterized by a plurality of paddles mounted on a longitudinal rotating shaft, preferably mounted on two parallel co-rotating shafts. The paddles cover at least about 40 percent of the active length of the shafts. This configuration provides for significant residence time in the mixer and low pressure gum base manufacture.

29 Claims, 5 Drawing Sheets

CONTINUOUS GUM BASE MANUFACTURE USING PADDLE MIXING

FIELD OF THE INVENTION

This invention relates to a continuous process for making chewing gum base. More specifically, this invention is directed to a process for making chewing gum base using a continuous process known as paddle mixing.

BACKGROUND OF THE INVENTION

Chewing gum base is conventionally prepared using a batch mixer, for example, a sigma blade mixer, using a mixing time of about one to four hours per batch. Typically, predetermined amounts of elastomer, elastomer plasticizers and fillers are added to a heated sigma blade mixer having a front to rear blade speed ratio of about 2:1. After the initial ingredients have massed homogeneously, a balance of elastomer plasticizer, filler, softeners/emulsifiers, waxes (when used) and other ingredients are added sequentially to the batch mixer and blended until a homogeneous mass is attained. The final mass temperature can be between 60° C. and 150° C., preferably between 80° C. and 120° C. The completed molten mass is emptied from the mixing kettle into coated or lined pans, extruded or cast into any desirable shape and allowed to cool and solidify.

The foregoing batch process, which operates under conditions of low shear and little or no pressure, has been very effective in providing well-mixed chewing gum bases, with little or no degradation of the gum base components occurring during mixing. However, the process has the disadvantage of requiring a long mixing time. Also, because the process involves batch mixing, not at steady state, there may be small but detectable variations in color, consistency or taste between different batches.

In order to shorten the mixing time and eliminate variations between batches, consideration has been given to mixing gum base continuously. However, most known continuous mixing processes, for example, twin screw extruders, have been difficult to use successfully because their residence time is too short, i.e., on the order of a few minutes. This extreme shortening of residence time has made it difficult to produce a homogeneous gum base without lumps, islands, and other inconsistencies.

U.S. Pat. No. 3,995,064, issued to Ehrgott et al., discloses the concept of making chewing gum base continuously. To accomplish this, the gum base must be exposed to some mixing under high intensity and shear, in order to disperse the elastomer. However, high shear mixing may increase the amount of degraded gum base ingredients in the product. Also, the reference recommends using a number of separate preblending operations to help achieve product homogeneity.

French Publication No. 2,635,441, to Boudy, discloses making a gum base concentrate using a continuous process. Polymers, plasticizers and fillers are introduced into different sleeves of a twin screw extruder having a residence time not exceeding 1.5 minutes. The twin screw extruder includes a region of high shear mixing to help disperse the ingredients. Later, the gum base premix is combined with other gum base ingredients using a separate process.

European Publication No. 0,273,809, to Horst, discloses a process for making a chewing gum base using an industrial mill. Elastomer and filler are fed to the mill, heated, and mixed for 35 to 75 minutes, to produce a gum base premix. The premix is then discharged from the mill, fragmented, and combined with other gum base ingredients using a powder mixer.

U.S. Pat. No. 4,217,368, issued to Witzel et al., and U.S. Pat. No. 4,208,431, issued to Friello et al., disclose standard batch gum base processes using sigma blade mixers. U.S. Pat. No. 4,968,511, issued to D'Amelia et al., discloses a direct one-step process for making chewing gum without the intermediate step of forming a chewing gum base, using a specific mixture of ingredients.

Notwithstanding the foregoing efforts, there remains a need or desire in the chewing gum industry for an effective method of making a chewing gum base continuously, to save time and eliminate inconsistencies between batches, without using high shear or employing multiple preblending steps.

SUMMARY OF THE INVENTION

The present invention is a method for the continuous manufacture of chewing gum base which uses low shear, very little pressure, and a mixing residence time which is higher than for a typical twin screw extrusion process yet much lower than for conventional batch processes for making gum base. The mixing is accomplished using a sequence of "paddles". Some of the paddles can be arranged at "right hand" angles to convey the gum base ingredients forward through the mixer. Most of the paddles have a "neutral" arrangement that is neither "right hand" nor "left hand", to continuously mix the gum base ingredients without facilitating significant forward conveyance. A few of the paddles can have a "left hand" arrangement which helps fill the downstream end of the mixer with gum base before the gum base is pushed through the exit nozzle or "die".

The paddle mixer is preferably partially open at the top, and there is virtually no pressure exerted by the gum base ingredients against barrel walls of the mixer. Although some conveying elements are used at the feed ports, the plurality of paddles cover at least 40% of the shaft, preferably 50% of the shaft and most preferably 60% of the shaft. This relatively high ratio of mixing paddles to conveying elements allows for low pressure mixing and long residence times. The individual paddles can be mounted on two parallel co-rotating shafts inside the mixer, and the paddles on the adjacent shafts can intermesh during rotation. By configuring most of the paddles in a neutral fashion, the forward conveyance of the gum base ingredients is minimized, and the residence time is increased to a level high enough to cause formation of a homogeneous gum base mass. The paddles can also include "right hand helical" paddle elements to facilitate conveyance, and "left hand helical" paddle elements to help fill the mixer at its downstream end, prior to exit of the gum base. Notwithstanding the possible presence of helical paddle elements, the mixing of the gum base ingredients is accomplished predominantly, if not substantially entirely, using non-helical (i.e. flat) paddles.

The various gum base ingredients may be added at more than one location in the paddle mixer, i.e., at different axial locations along the sequence of paddles. This allows a first group of gum base ingredients, for example, elastomer and fillers to become mixed before further gum base ingredients are added. In order to increase the residence time, and increase the flexibility of adding different ingredients at different locations, two or more paddle mixers can be used in series. Alternatively, some of the same advantages can be accomplished by increasing the ratio of length to diameter (L/D) of the sequence of paddles in a single paddle mixer.

It is a feature and advantage of the invention to provide a process for continuous gum base manufacture which achieves homogeneous mixing of gum base ingredients using a much lower mixing residence time than conventional batch processes.

It is also a feature and advantage of the invention to provide a continuous gum base manufacturing process which operates substantially at steady state, thereby minimizing the interruptions and possible inconsistencies associated with batch processes.

It is also a feature and advantage of the invention to provide a continuous gum base manufacturing process which may operate under conditions of low shear and melt pressure, thereby minimizing degradation of gum base ingredients.

It is also a feature and advantage of the invention to provide a continuous gum base mixing process which can be divided into stages, whereby a first group of gum base ingredients can be added to the mixer and blended upstream from the addition point of a second group of gum base ingredients.

It is also a feature and advantage of the invention to provide a continuous gum base manufacturing process which reduces or eliminates the need for preblending of some of the gum base ingredients.

The foregoing and other features and advantages of the invention will become further apparent from the following detailed description of the presently preferred embodiments, read in conjunction with the accompanying drawings. The detailed description and drawings are merely illustrative rather than limiting, the scope of the invention being defined by the appended claims and equivalents thereof.

DETAILED DESCRIPTION OF THE PRESENTLY PREFERRED EMBODIMENTS

In the most preferred embodiment of the invention, referring to FIGS. 1–3(a), a mixing paddle 10 having a flat (non-helical) configuration is shown. The term "mixing paddle" is defined herein as a four-sided mixing element having two flat surfaces 12 and 14, and two concave surfaces 16 and 18. The flat surfaces are parallel to each other and intersect only the concave surfaces. The concave surfaces oppose each other and intersect each other at two lines 20 and 22. A non-circular (preferably square) opening 24 passes through the center of each mixing paddle 10, in a direction perpendicular to the flat surfaces 12 and 14, and intersects both flat surfaces. The openings 24 are used for mounting a plurality of paddles on rotating shafts, in a predetermined sequence (FIG. 7).

Referring to FIGS. 3(a)–3(d), the mixing paddles 10 can be positioned on a shaft at the same or different rotational angles relative to each other. For purposes of the following description, the "No. 1 position" is defined pursuant to FIG. 3(a), wherein a straight line drawn on the flat surface 14 and intersecting the lines 20 and 22 coincides with a reference line (for example, a vertical line). The "No. 2 position" is defined pursuant to FIG. 3(b), wherein a straight line drawn on the flat surface 14 and intersecting the lines 20 and 22 is 45 degrees counter-clockwise from the reference line. The "No. 3 position" is defined pursuant to FIG. 3(c), wherein a straight line drawn on the flat surface 14 and intersecting the lines 20 and 22 is 90 degrees counter-clockwise from the reference line. The "No. 4 position" is defined pursuant to 3(d), wherein a straight line drawn on the flat surface 14 and intersecting the lines 20 and 22 is 135 degrees counter-clockwise from the reference line.

Because the paddles 10 in FIGS. 3(a)–3(d) are symmetrical, there is no need to further define the relative rotational positions of the paddles for angles of 180, 225, 270 and 315 degrees from the reference line. For example, a paddle having a rotational position of 180 degrees coincides exactly with a paddle having a rotational angle of zero (FIG. 3(a)). Similarly, a paddle having a rotational angle of 225 degrees coincides exactly with a paddle having a rotation angle of 45 degrees (FIG. 3(b)); a paddle having a rotational angle of 270 degrees coincides exactly with a paddle having a rotational angle of 90 degrees (FIG. 3(c)), and a paddle having a rotational angle of 315 degrees coincides exactly with a paddle having a rotational angle of 135 degrees (FIG. 3(d)).

Figures 7, 8:
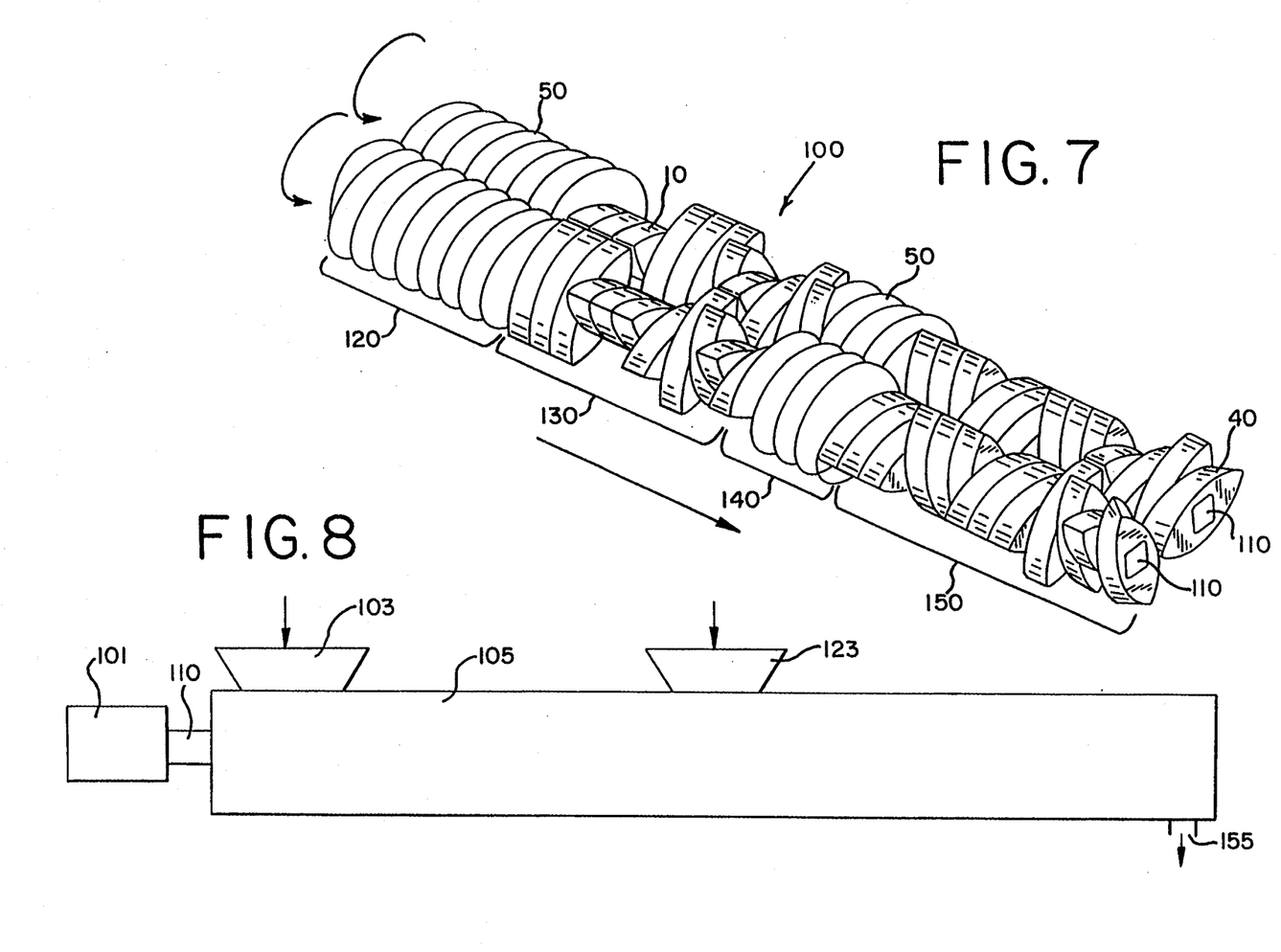
FIG. 7 is a perspective view of an overall paddle mixing configuration reflecting the presently preferred embodiment of a paddle mixer.
FIG. 8 is a schematic illustration of a barrel and feeder arrangement which can be used in conjunction with the paddle mixer configuration shown in FIG. 7.

It is also understood that each mixing paddle 10 will be in constant rotation during operation of the paddle mixer, due to the rotation of the shafts supporting the paddles (FIG. 7). For purposes of describing the mixing paddles in terms of relative rotational positions (i.e. relative to each other) as explained above, the reference line should be deemed to rotate as the paddles rotate. For example, if the mixing paddles shown in FIGS. 3(a)–3(d) are positioned sequentially on a single shaft, and if the shaft is rotated 90 degrees, then the chosen reference line, initially vertical, would rotate to a horizontal position. In other words, the relative rotational positions of the mixing paddles in FIGS. 3(a)–3(d), defined respectively as 1-2-3-4, will not change during operation of the paddle mixer.

Figure 4A:
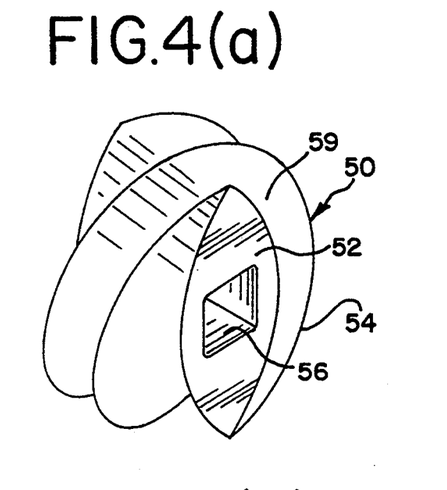
FIG. 4(a) is a perspective view of a feeding element (not a paddle element) used in the feed areas of a paddle mixer.
Figure 4B:
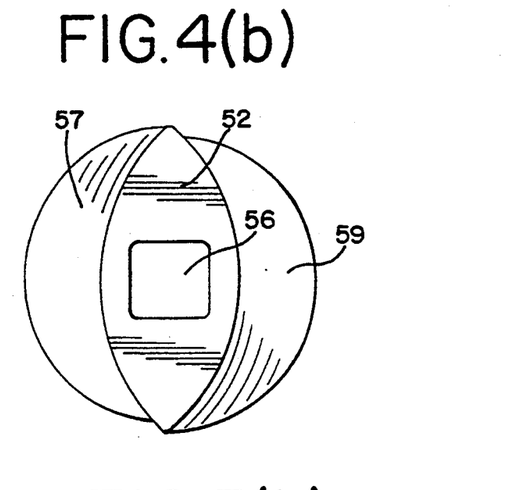
FIG. 4(b) is a front view of the feed element of FIG. 4(a).

Referring to FIGS. 4(a) and 4(b), the method of the invention also provides for the use of a minor portion of non-paddle elements known as forward conveying or feed elements 50. Each feed element 50 has a flat front surface 52, a flat back surface 54 parallel to the front surface, and a non-circular (preferably square) opening 56 perpendicular to and intersecting the front and back surfaces. However, unlike the mixing paddles described above, the feed elements do not have two concave surfaces intersecting at two lines. Instead, each feed element 50 includes portions of two alternating helical channels 57 and 59. The helical channels are more apparent in FIG. 7 wherein a plurality of feed elements 50 are combined in sequence on the rotating shafts 110 to form feed sections in the mixer. The primary purpose of the feed elements 50 is to convey chewing gum base ingredients forward to the regions of the mixer where paddle mixing takes place.

Figure 5A:
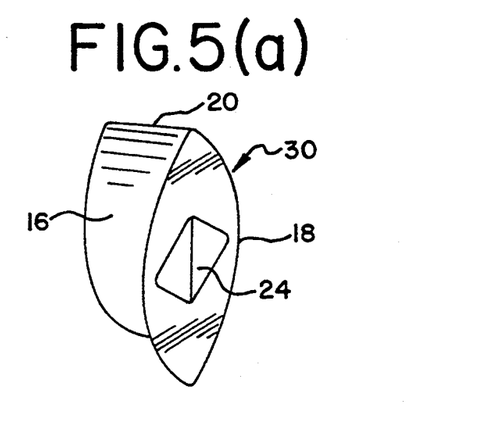
FIG. 5(a) is a perspective view of a forward helical mixing paddle which can be used in accordance with the method of the invention.
Figure 5B:
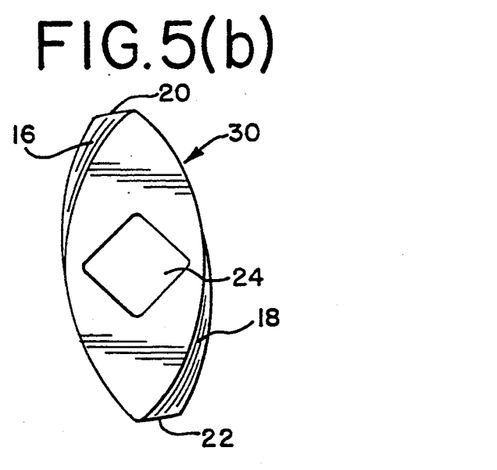
FIG. 5(b) is a front view of the forward helical mixing paddle of FIG. 5(a).

Referring to FIGS. 5(a) and 5(b), a type of mixing paddle known as a forward helical paddle 30 can also be used with the method of the invention. When used, the forward helical paddle 30 imparts a slight forward conveying action while mixing the gum base ingredients. Like the flat mixing paddles 10, each forward helical paddle 30 has two flat surfaces 12 and 14, and two concave surfaces 16 and 18. The flat surfaces are parallel to each other and intersect only the concave surfaces. The concave surfaces oppose each other and intersect at two lines 20 and 22. Again, a non-circular (preferably square) opening 24 passes through the center of each mixing paddle 30 and intersects both flat surfaces.

Figure 1:
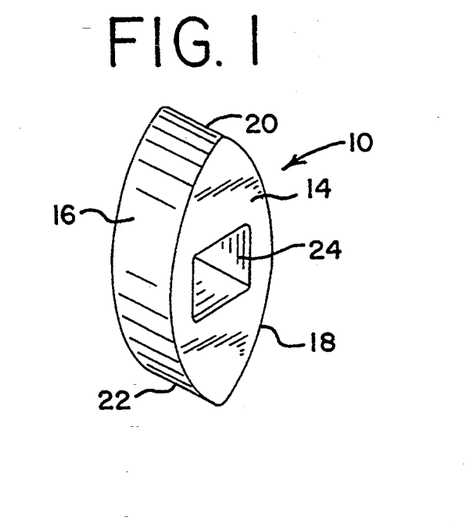
FIG. 1 is a perspective view of a single flat mixing paddle as used in the method of the invention.
Figure 2:
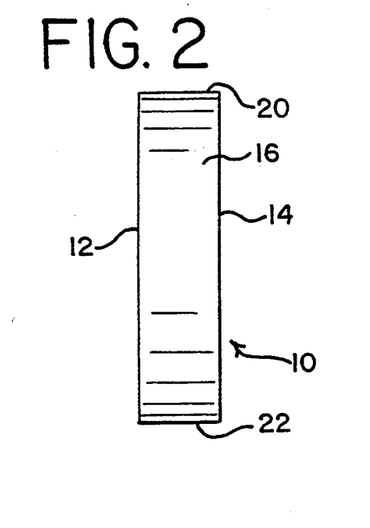
FIG. 2 is a side view of the mixing paddle of FIG. 1.
Figure 3A:
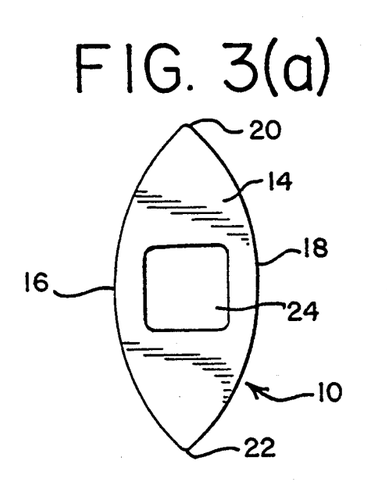
FIG. 3(a) is a front view of the mixing paddle of FIG. 1, shown at zero degrees rotation (referred to as the no. 1 position).
Figure 3B:
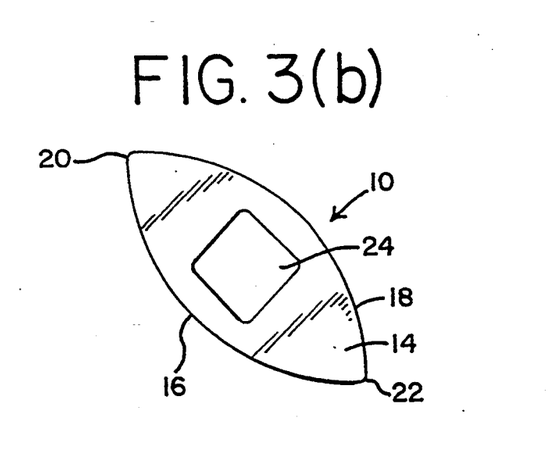
FIG. 3(b) is a front view of the mixing paddle of FIG. 1, shown at 45 degrees counter-clockwise rotation (referred to as the no. 2 position).
Figure 3C:
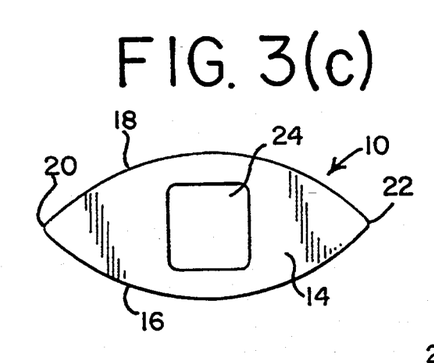
FIG. 3(c) is a front view of the mixing paddle of FIG. 1, shown at 90 degrees counter-clockwise rotation (referred to as the no. 3 position).
Figure 3D:
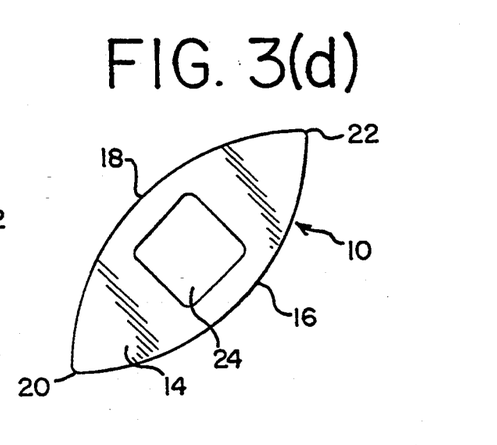
FIG. 3(d) is a front view of the mixing paddle of FIG. 1, shown at 135 degrees counter-clockwise rotation (referred to as the no. 4 position).

The difference between the forward helical paddle 30 and the flat mixing paddle 10 is that, in the flat mixing paddle 10, the lines 20 and 22 (defining the intersections of concave surfaces 16 and 18) are parallel to each other as shown in FIG. 1. In the forward helical paddle, the line 20 has been rotated counter-clockwise with respect to the line 22 so that the lines are no longer parallel, as shown in FIG. 5(b). Similarly, the line 22 has been rotated clockwise with respect to the line 20. The effect of this rotation is to bend the concave surfaces 16 and 18 so that these surfaces have a mildly helical configuration.

Figure 6A:
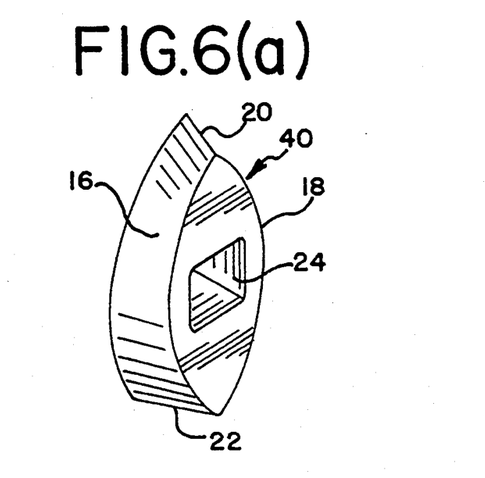
FIG. 6(a) is a perspective view of a reverse helical mixing paddle which can be used in accordance with the method of the invention.
Figure 6B:
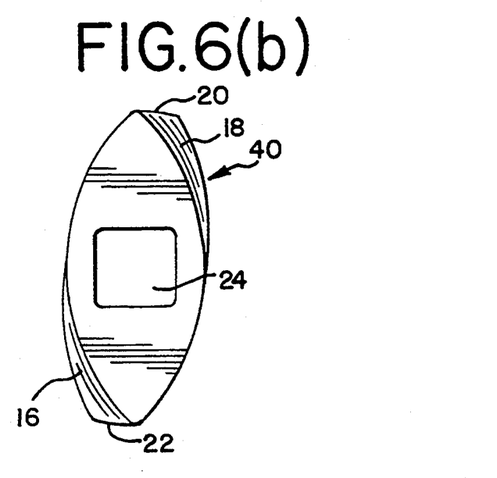
FIG. 6(b) is a front view of the reverse helical mixing paddle of FIG. 6(a).

Referring to FIGS. 6(a) and 6(b), a type of mixing paddle known as a reverse helical paddle 40 can also be used with the method of the invention. When used, the reverse helical paddle 40 imparts a slight resistance to forward conveying of the gum base ingredients while mixing the ingredients. This causes a locally higher degree of mixer fill and slight elevation in pressure, in the vicinity of the reverse helical paddle 40.

The reverse helical paddle 40 is configured in the same fashion as the forward helical pattern 30 discussed above, except that the lines 20 and 22 (defining the intersections of concave surfaces 16 and 18) are rotated in the opposite directions. Referring to FIG. 6(b), the line 20 has been rotated clockwise with respect to the line 22, and the line 22 has been rotated counter-clockwise with respect to the line 20. The effect of this rotation is to bend the concave surfaces 16 and 18 so that these surfaces have a mild reverse helical configuration.

Figure 5C:
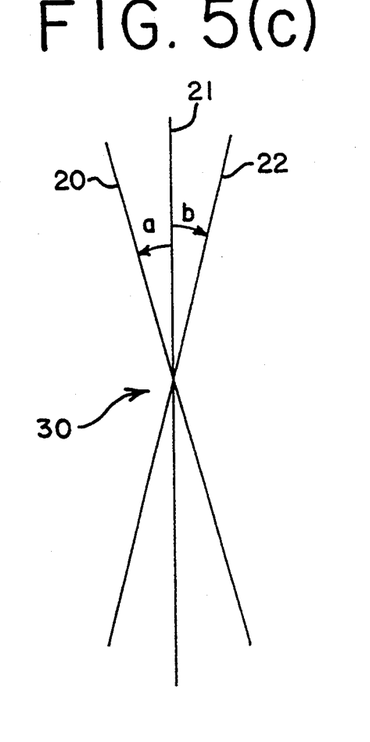
FIG. 5(c) is based on a top view of the forward helical mixing paddle of 5(a), showing only the top intersection line 22 superimposed over the bottom intersection line 20, and a reference line 21.
Figure 6C:
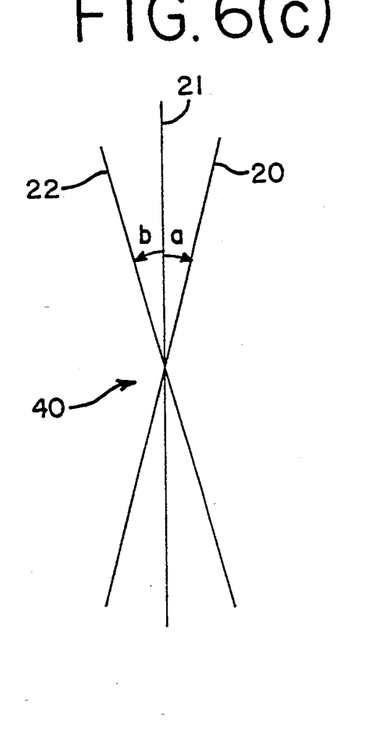
FIG. 6(c) is based on a top view of the reverse helical mixing paddle of FIG. 6(a), showing only the top intersection line 22 superimposed over the bottom intersection line 20, and a reference line 21.

The degree of rotation of lines 20 and 22 for the forward and reverse helical paddles 30 and 40 can be explained with reference to FIGS. 5(c) and 6(c). In FIGS. 5(c) and 6(c), the helical paddles have been viewed from above and only the lines 20 and 22 of the paddles are shown, superimposed one on top of the other. A reference line 21 is also shown, indicating the positions of lines 21 and 22 if there were no rotation, as in a flat paddle 10.

Referring to FIG. 5(c), the angle "a" is the amount of counter-clockwise rotation of line 20 present in a forward helical paddle 30. the angle "a" should be between about 5 and about 30 degrees, preferably between about 10 and about 18 degrees, most preferably about 13 degrees, 53 minutes, 50 seconds. The angle "b" is the amount of clockwise rotation of line 22 present in a forward helical paddle 30. The angle "b" should be between about 5 and about 30 degrees, preferably between about 10 and about 18 degrees, most preferably about 13 degrees, 53 minutes, 50 seconds.

Referring to FIG. 6(c), the angle "a" is the amount of clockwise rotation of line 20 present in a reverse helical paddle 40. The angle "a" should be between about 5 and about 30 degrees, preferably between about 10 and about 18 degrees, most preferably about 13 degrees, 53 minutes, 50 seconds. The angle "b" is the amount of counter-clockwise rotation of line 22 present in a reverse helical paddle 40. The angle "b" should be between about 5 and about 30 degrees, preferably between about 10 and about 18 degrees, most preferably about 13 degrees, 53 minutes, 50 seconds.

Referring to FIG. 7, the mixing paddles and feed elements are assembled on two parallel shafts 110 in a predetermined configuration. In the embodiment shown, for a 5-inch paddle mixer, each of the shafts 110 has an active length of 36 inches and a square cross-sectional area of 1,375 inches×1,375 inches (1,891 square inches). The parallel shafts 110 are spaced apart at a distance of 3.5 inches (center to center). The shafts 110 are adapted for co-rotation (rotation in the same direction) inside a mixing barrel. Each of the shafts 110 supports an identical arrangement of mixing paddles and feed elements. The mixing paddles and feed elements on the adjacent shafts may intermesh, as shown in FIG. 7, but do not touch each others as the shafts rotate.

Each of the shafts 110 is long enough to accommodate thirty-six inches of elements, each having a length of 1 inch, a maximum diameter of 4.874 inches and a minimum diameter of 2 inches. Two or more 1-inch segments may be combined to make longer elements without affecting the operation. For instance, the feed elements 50 often have a length of 2 inches. For purposes of the invention, a large portion of each shaft should be covered with mixing paddles. Generally, at least about 40 percent of each shaft should be covered with mixing paddles. Preferably at least about 50 percent of each shaft is covered with mixing paddles, most preferably at least about 60 percent. Of the mixing paddles, a majority should be flat mixing paddles as opposed to forward helical or reverse helical paddles. In the embodiment shown in FIG. 7, 67 percent of the shaft length is covered with mixing paddles (24 one-inch elements) and 33 percent of the shaft length is covered with feed elements (6 two inch elements).

The mixer configuration 100 in FIG. 7 includes two feed sections 120 and 140, and two paddle mixing sections 130 and 150. The specific mixer configuration is indicated in Table 1 below. In Table 1 and other tables, the following abbreviations are used:

FC—feed conveying element (each occupying two 1-inch positions)

FP—flat mixing paddle (each occupying one 1-inch position)

FH—forward helical mixing paddle (each occupying one 1-inch position)

RH—reverse helical mixing paddle (each occupying one 1-inch position)

TABLE 1

| Mixer Configuration (Per Shaft) - FIG. 7 | | | | | |
|---|---|---|---|---|---|
| Longitudinal Position | Element | Rotational Position | Longitudinal Position | Element | Rotational Position |
| 1 | FC | 4 | 19 | FP | 3 |
| 2 | FC | 4 | 20 | FC | 3 |
| 3 | FC | 4 | 21 | FC | 3 |
| 4 | FC | 4 | 22 | FC | 3 |
| 5 | FC | 4 | 23 | FC | 3 |
| 6 | FC | 4 | 24 | FP | 3 |
| 7 | FC | 4 | 25 | FP | 3 |
| 8 | FC | 4 | 26 | FP | 3 |
| 9 | FP | 4 | 27 | FP | 1 |
| 10 | FP | 4 | 28 | FP | 1 |
| 11 | FP | 4 | 29 | FP | 1 |
| 12 | FP | 2 | 30 | FP | 3 |
| 13 | FP | 2 | 31 | FP | 3 |
| 14 | FP | 2 | 32 | FP | 3 |
| 15 | FP | 3 | 33 | FP | 4 |
| 16 | FP | 4 | 34 | FP | 1 |
| 17 | FP | 1 | 35 | FP | 2 |
| 18 | FP | 2 | 36 | RH | 1 |

The use of two or more feed sections and two or more mixing sections in the mixer configuration 100, permits sequential addition and mixing of different gum base ingredients. For example, a high viscosity portion including elastomer, filler, and some resin or polyvinyl acetate can be continuously fed to the first feed section 120 in FIG. 7. These ingredients can then be thoroughly mixed in the first paddle mixing section 130 before being combined with additional ingredients. A lower viscosity portion including waxes (when used), fats, oils, colorants and additional resin or polyvinyl acetate can be continuously fed to the second feed section 140. All gum base ingredients can then be thoroughly mixed in the second paddle mixing section 150.

The mixer configuration 100 shown in FIG. 7 is, in practiced surrounded by one or more barrel segments extending the length of the mixer configuration 100. FIG. 8 illustrates, schematically, a typical barrel 105 surrounding the mixer configuration 100. A motor 101 drives the shafts 110 which support the mixer elements. The gum base ingredients are fed through feed ports 103 and 123 in the barrel 105. The gum base remains in the mixer for a sufficient time to ensure homogeneity, for example, a time on the order of about 20-30 minutes, and exits through an exit nozzle 155.

The barrel 105 may be heated or cooled. Heating may be accomplished using hot water or a steam jacket surrounding the barrel (not shown). Cooling may be accomplished by supplying cooling water to a jacket surrounding the barrel 105. Alternative methods of heating and cooling may also be employed. Generally, heating is applied at the start up, but cooling is applied in the latter stages to prevent overheating and base degradation.

The heating and cooling of the barrel should be supplied, as necessary, to maintain the product exit temperatures at about 90° C.–150° C., preferably at about 100°–135° C., during mixing of the gum base ingredients.

Figure 9:
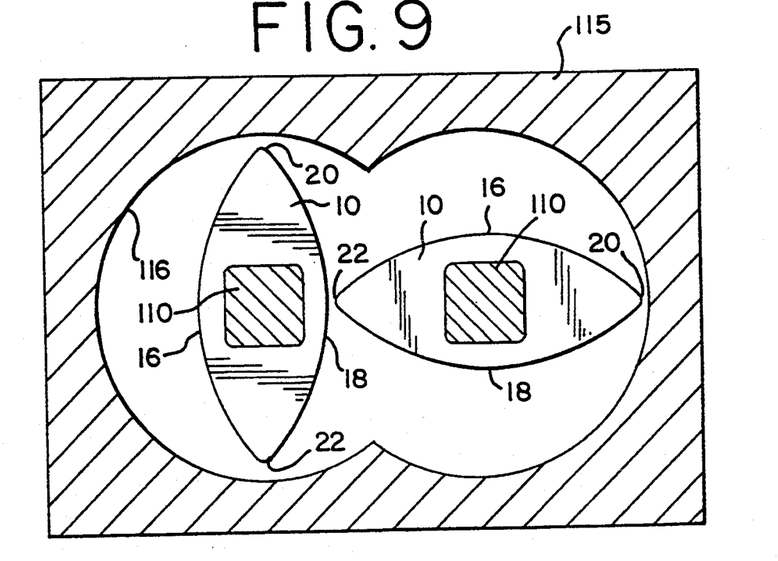
FIG. 9 is a front sectional cutout of a barrel, showing the relationship between the rotating paddles and the barrel wall.

FIG. 9 is a sectional view of the barrel 105 which indicates how the paddle mixer is able to operate with longer residence times, compared to a conventional twin screw extruder. As shown in FIG. 9, the barrel wall 116 has the shape of two intersecting cylinders, each cylinder having a diameter larger than the largest diameter of the mixing paddle 10 contained therein. This barrel configuration resembles that of a standard twin screw extruder. However, unlike the screws of a twin screw extruder, the paddles 10 do not mostly fill the space defined by the barrel wall 116.

The mixing paddles 10 have a typically close tolerance with the barrel wall 116, and with each other, in the vicinity of the lines 20 and 22 where the concave surfaces intersect. For paddles 10 having a long diameter of 4.874 inches, the closest tolerance between each paddle and the barrel wall 116 may be on the order of about 0.048 inch to about 0.078 inch, and the closest tolerance between the two paddles may be on the order of about 0.060 inch to about 0.090 inch. However, away from the lines 20 and 22, the distance between each paddle 10 and the barrel wall 116 is much greater. Due to the unique design of the paddles 10, the percentage of barrel space occupied by the paddles 10 is much smaller than for a conventional twin screw extruder. Also, the pressure in the paddle mixer should remain below about 50 psig, preferably below about 20 psig, when there is a large percentage of paddles compared to other elements. Each paddle when viewed from the front as in FIG. 9, has a smaller width than height. Preferably, the ratio of height to width of each mixing paddle is more than 1.5:1. Most preferably, the ratio of height to width for each mixing paddle is more than 2:1.

The large amount of available barrel space also allows the method of the invention to be practiced at high residence times. The high proportion of mixing paddles, especially flat paddles, also contributes to the longer residence times and lower pressure. The average residence time in the paddle mixer should be at least about 10 minutes, preferably more than 15 minutes, most preferably more than 20 minutes.

The remaining operating parameters, e.g., mixer rpm, feed rates, production rates, etc. vary depending on the size of the mixer and on the specific gum base composition. A commercially available paddle mixer suitable for practicing the invention is a Teledyne Readco Continuous Processor, available from Teledyne Readco in York, Pennsylvania. These paddle mixers are available in a wide variety of sizes. Paddle diameters for the different size mixers range from 2 to 24 inches, and the ratios of mixer length to diameter (L/D) range from 4:1 to 14:1. For purposes of the present invention, the maximum paddle diameter is preferably between 2 inches and 5 inches, and the L/D is preferably about 7:1. The paddle mixer configuration and process conditions should be selected so that a homogeneous gum base product is achieved.

Figure 10:
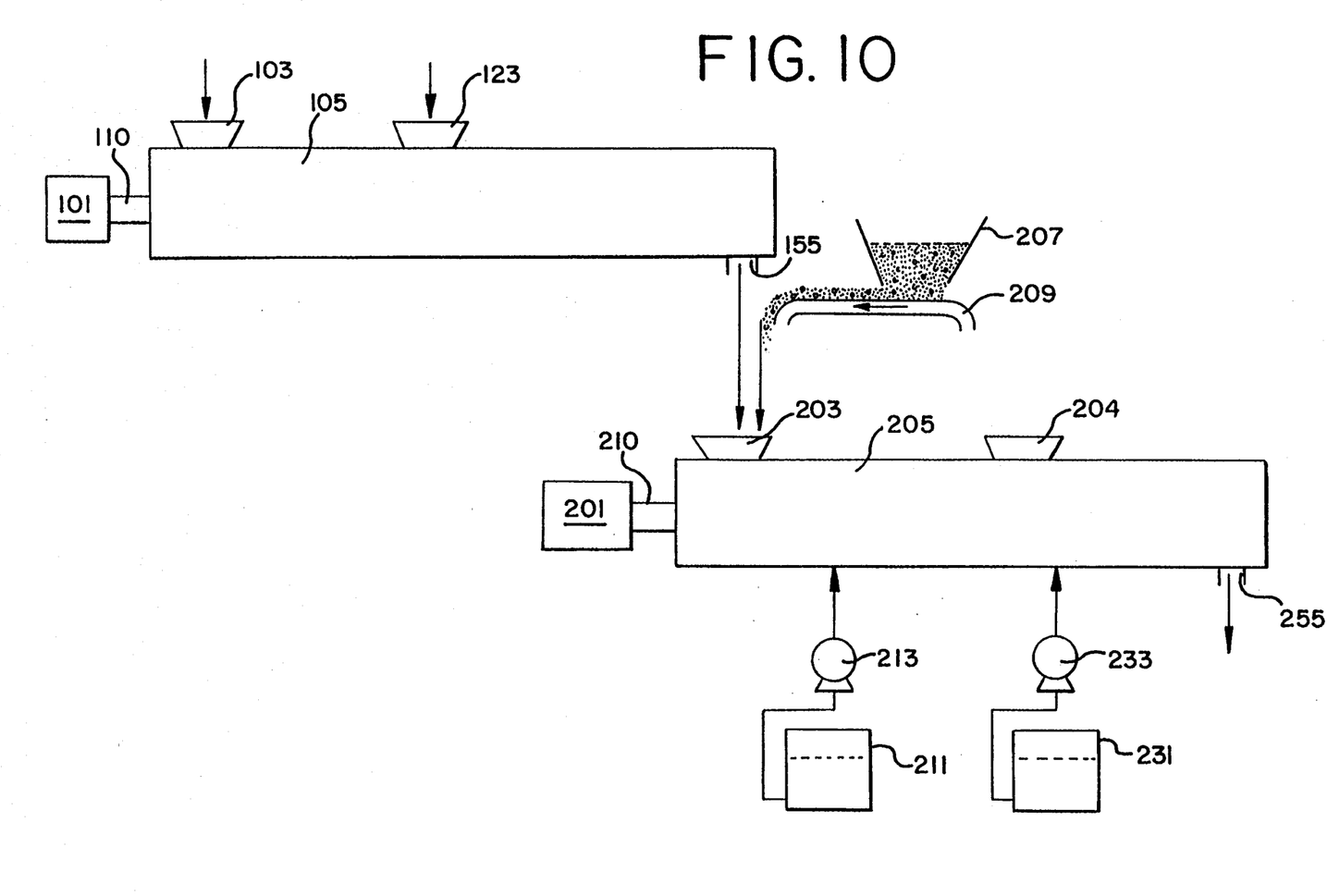
FIG. 10 is a schematic illustration of two paddle mixers arranged in series.

In a particularly useful embodiment, two or more paddle mixers may be used in series, in the manner illustrated in FIG. 10. The use of two mixers in series allows greater flexibility for feeding different gum base ingredients at different locations. A combination of elastomer, filler and resin can be continuously fed via feed port 103 to the feed barrel 105 of the first mixer. These materials are mixed in the first mixer, after which additional resin can be added to the first mixer via feed port 123. The combined ingredients are blended in the first mixer, and leave the first mixer at the exit 155, whereupon they are immediately fed into the barrel 205 of the second mixer via the feed port 203. Polyvinyl acetate can also be continuously fed to the barrel 205 from hopper 207, via feed conveyor 209 and feed port 203.

Further ingredients, such as waxes or oils, can be injected into the second mixer from feed tanks 211 and 231, via pumps 213 and 233. Optionally, a portion of ingredients can be added into a downstream feed port 204. After all the components are mixed, the gum base leaves the second mixer via exit 255. A wide variety of different feeding and mixing arrangements can also be employed using two or more paddle mixers in series, in order to achieve good dispersion of ingredients and a wide variety of gum base products.

In addition to the paddles described above, a wide variety of mixing paddles, available from various extruder companies, can be used. Paddles, often called kneading elements, must have the effect of mixing in an extruder. Paddles can be two-sided, three-sided, or multiple sided.

The paddle mixer, which may be referred to as a compounder, has different characteristics than a typical extruder even though the same equipment may be used. The difference between an extruder and a compounder is the ratio of paddles or kneading elements to the conveying elements. Conveying elements and compression elements cause an extruder to build up pressure. Paddles or kneading elements do not build as much pressure in the extruder, thus there is more mixing with low pressure. If the extruder contains at least 40% kneading elements, then the pressure can be about one-fifth to one-tenth that of a typical extruder which uses more conveying and compression elements.

Nearly all extruders can be used as compounders. However, compounders which have a low L/D ratio of about 3:1 to 20:1 cannot generally be used as high pressure extruders. Also, compounders with this low L/D ratio have less effective shaft length and may require more paddle or kneading elements compared to conveying elements. For this type of compounder, mixing paddles should cover at least 50%, and preferably at least 60% of the shaft. Conversely, for an extruder having an L/D of about 20/1 to about 40/1, only about 40% of the shaft needs to be covered with mixing paddles or kneading elements. For extruders with high L/D ratios greater than 40/1, only about 30% of the shaft may need to be covered with mixing paddles or kneading elements.

One of the key advantages to the preferred embodiment of the paddle mixer disclosed above is that the residence time is much higher than in typical extruders. Many extruders provide a residence time of less than 2 minutes or even less than 1 minute. However, in the preferred paddle mixer described above, a residence time of at least 10 minutes, and preferably at least 15–20 minutes, can be provided.

The method of the invention contemplates the making of any commercial chewing gum base product. Elastomers may constitute about 5 to about 95 percent by weight of the gum base, preferably between 10 and 70 percent by weight and most preferably between 15 and 45 percent by weight. Elastomers may include synthetic elastomers such as polyisobutylene, isobutyleneisoprene copolymer, and styrene-butadiene copolymer; plastic polymers such as polyvinylacetate, vinyl acetate-vinyl laurate copolymer; or mixtures thereof. Natural elastomers may also include natural rubber such as smoked or liquid latex and guayule as well as natural gums such as jelutong, lechi caspi, perillo, massaranduba balata, massaranduba chocolate, nispero, rosindinha, chicle, gutta hang kang or mixtures thereof.

Elastomer plasticizers may constitute from about 0 to about 75 percent by weight of the gum base, preferably 5 to 45 percent by weight and most preferably 10 to 30 percent by weight. Elastomer plasticizers include natural rosin esters such as glycerol ester of partially hydrogenated rosin, glycerol ester of polymerized rosin, glycerol ester of partially dimerized rosin, glycerol ester of rosin, pentaerythritol esters of partially hydrogenated rosin, methyl and partially hydrogenated methyl esters of rosin, pentaerythritol ester of rosin or mixtures. Elastomer plasticizers also include synthetics such as terpene resins derived from alpha-pinene, betaopinene and/or d-limonene.

Waxes include synthetic (e.g. polyethylene and FischeroTropsch waxes), natural (candelilla carnauba, beeswax, rice bran or mixtures thereof) and petroleum (e.g. microcrystalline and paraffin). Waxes, when used, generally constitute up to 30 weight percent of the gum base.

Softeners/emulsifiers include tallow, hydrogenated tallow, hydrogenated and partially hydrogenated vegetable oils, cocoa butter, glycerol monostearate, glycerol triacetate, lecithin, mono-, di- and triglycerides, acetylated glycerides and fatty acids (e.g. stearic, palmitic, oleic, linoleic and linolenic acids) or mixtures thereof. Softeners/emulsifiers generally constitute between 0.5 and 40 weight percent of the gum base.

Fillers/texturizers include magnesium and calcium carbonate, ground limestone and silicate types such as magnesium and aluminum silicate, clay, alumina, talc as well as titanium oxide, mon-, di- and tricalcium phosphate, cellulose polymers such as ethyl, methyl and wood or mixtures thereof. Preferably, the filler comprises about 1 to about 65 percent by weight of the gum base.

Colorants and whiteners include FD&C-type dyes and lakes, fruit and vegetable extracts, titanium dioxide or mixtures thereof.

A wide range of changes and modifications to the embodiments of the invention described above will be apparent to persons skilled in the art. The following examples are not to be construed as imposing limitations on the invention, but are included merely to illustrate preferred embodiments.

EXAMPLE 1

Using a 5-inch paddle diameter Teledyne Readco Continuous Mixer, having the mixer configuration illustrated in FIG. 7 and described above, chewing gum base was made as follows.

A mixture of ground isobutylene-isoprene copolymer (2–7 mm. particle size), calcium carbonate (<12 micron particle size), and terpene resin at a ratio of 8:21:17 was fed at a rate of 0.383 lbs/min. at the first feed inlet, In the second feed inlet, 3 mixtures were added: 1) a powder blend of polyvinyl acetate, glycerol monostearate, and hydrogenated soybean and vegetable oils at a ratio of 24:5:13 fed at a rate of 0.35 lbs/min., 2) 6 parts molten polyisobutylene at 130° C., fed at a rate of 0.05 lbs/min., and 3) 6 parts of a 1:1 ratio of hydrogenated cottonseed oil and lecithin at 70° C. fed at a rate of 0.05 lbs/min.

Overall, the production rate for the gum base was 50 pounds per hour. The gum base was manufactured using an extruder rpm of 400, initial barrel temperatures of 270°–275° F., and a product exit temperature of about 128° C. The average residence time in the paddle mixer was about 30–40 minutes.

EXAMPLE 2

This example was performed using a 2-inch paddle diameter Teledyne Readco Continuous Mixer and a 5-inch paddle diameter Teledyne Readco Continuous Mixer in series, similar to the arrangement shown in FIG. 10, with the 2-inch paddle diameter mixer being first. The mixers were configured with the objective of accomplishing dispersive mixing of rubber using the 2-inch compounder, and distributive mixing of oil using the 5-inch compounder. Specifically, the 2-inch and 5-inch compounders were configured as described in Tables 2 and 3.

The 2-inch compounder included 4 inches of conveying elements, and a balance of reverse helical and flat paddles, each 0.53 inch long. Overall, twenty-five reverse helical and flat paddles (total) were used, for a total paddle length of 13.25 inches. The total active length of each of the shafts carrying the paddles was 17.25 inches. The 5-inch compounder used paddles and conveying elements with the dimensions described above.

TABLE 2

Mixer Configuration (Per Shaft) For 2-inch Teledyne Readco Mixer

| Longitudinal Position | Element | Rotational Position | Longitudinal Position | Element | Rotational Position |
|---|---|---|---|---|---|
| 1 | FC | 4 | 16 | FP | 2 |
| 2 | FC | 4 | 17 | FP | 4 |
| 3 | FC | 4 | 18 | FP | 4 |
| 4 | FC | 4 | 19 | FP | 4 |
| 5 | FP | 4 | 20 | FP | 2 |
| 6 | FP | 4 | 21 | FP | 2 |
| 7 | FP | 4 | 22 | FP | 2 |
| 8 | FP | 2 | 23 | FP | 3 |
| 9 | FP | 2 | 24 | FP | 4 |
| 10 | FP | 2 | 25 | FP | 1 |
| 11 | FP | 4 | 26 | FP | 2 |
| 12 | FP | 4 | 27 | FP | 4 |
| 13 | FP | 4 | 28 | FP | 4 |
| 14 | FP | 2 | 29 | RH | 2 |
| 15 | FP | 2 | | | |

TABLE 3

Mixer Configuration (Per Shaft) For 5-inch Teledyne Readco Mixer

| Longitudinal Position | Element | Rotational Position | Longitudinal Position | Element | Rotational Position |
|---|---|---|---|---|---|
| 1 | FC | 4 | 19 | FP | 2 |
| 2 | FC | 4 | 20 | FP | 2 |
| 3 | FC | 4 | 21 | FP | 4 |
| 4 | FC | 4 | 22 | FP | 4 |
| 5 | FC | 4 | 23 | FP | 4 |
| 6 | FC | 4 | 24 | FP | 2 |
| 7 | FC | 4 | 25 | FP | 2 |
| 8 | FC | 4 | 26 | FP | 2 |
| 9 | FP | 4 | 27 | FP | 4 |
| 10 | FP | 4 | 28 | FP | 4 |
| 11 | FP | 4 | 29 | FP | 4 |
| 12 | FP | 2 | 30 | FP | 1 |
| 13 | FP | 2 | 31 | FP | 2 |
| 14 | FP | 2 | 32 | FP | 3 |
| 15 | FP | 4 | 33 | FP | 4 |
| 16 | FP | 4 | 34 | FP | 2 |
| 17 | FP | 4 | 35 | FP | 2 |
| 18 | FP | 2 | 36 | RH | 4 |

The feed ports were arranged as follows:

Feed Port No. 1—above longitudinal positions 1–4 on 2-inch mixer

Feed Port No. 2—above longitudinal positions 1–4 on 5-inch mixer

Feed Port No. 3 (oil injection)—at longitudinal position 9 on 5-inch mixer

Using the above mixer arrangement, chewing gum base was made as follows.

A mixture of ground isobutylene-isoprene copolymer (2–7 mm particle size) and calcium carbonate at a ratio of 10:13 was fed at a rate of 0.192 lbs/min. to feed port No. 1. Also added at feed port No. 1 was 16 parts polyisobutylene at 130° C. at a rate of 0.133 lbs/min. At feed port No. 2, 22 parts polyvinyl acetate and 29 parts of a powder blend of hydrogenated vegetable oil, glycerol monostearate, and hydrogenated soybean oil at a ratio of 13:3:13 were added at a rate of 0.425 lbs/min. Also added at feed port No. 2 was a liquid blend at 70° C. of 5 parts hydrogenated cottonseed oil and 5 parts lecithin at a rate of 0.083 lbs/min. Feed port No. 3 was not used.

Overall, the production rate for the gum base was 50 pounds per hour. The gum base was manufactured using the following process conditions:

| | 2-Inch Mixer | 5-Inch Mixer |
|---|---|---|
| RPM | 314 | 450 |
| Initial Barrel Temp., °F. | 265–270 | 225–230 |
| Product Exit Temp., °C. | 164 | 133 |
| Average Residence Time | 2–6 min. | 30–40 min. |

About 60 pounds of gum base product was made at these conditions. The gum base had normal color, a smooth texture, and a homogeneous consistency, except for an occasional wood sliver resulting from a previous use of the equipment.

EXAMPLE 3

This example was performed using the same two-mixer arrangement described in Example 2. The 2-inch and 5-inch Teledyne Readco Continuous Mixers were configured as described in Tables 2 and 3, above. The feed ports were arranged as described in Example 2.

Using the above mixer arrangement, bubble gum base was made as follows.

A mixture of styrene-butadiene rubber, calcium carbonate (<12 micron particle size), and glycerol ester of wood rosin at a ratio of 9:46:18 was added at feed port No. 1 at a rate of 0.608 lbs/min. At feed port No. 2, a mixture of glycerol ester of wood rosin, glycerol monostearate, and microcrystalline wax (m.p.=180° F.) at a ratio of 20:1:6 was added at a rate of 0.175 lbs/min. Feed port No. 3 was not used.

Overall, the production rate for the bubble gum base was 47 pounds per hour. The gum base was manufactured using the following process conditions:

|  | 2-Inch Mixer | 5-Inch Mixer |
| --- | --- | --- |
| RPM | 314 | 450 |
| Initial Barrel Temp., °F. | not recorded | 225-230 |
| Product Exit Temp., °C. | 140 | not recorded |
| Average Residence Time | 2-6 min. | 30-40 min. |

About 40 pounds of bubble gum base was made at these conditions. The gum base had normal color, a smooth texture, and a homogeneous consistency.

EXAMPLE 4

This example was performed using a two-mixer arrangement described in Example 2, except for the following changes. Again, the 2-inch Teledyne Readco Continuous Mixer was configured as described in Table 2 of Example 2. However, the 5-inch Teledyne Readco Continuous Mixer was configured as described in Table 1 (Example 1) except that a reverse helical paddle was placed in position 19. The feed ports were arranged as follows:

Feed Port No. 1—above longitudinal positions 1-4 on 2-inch mixer

Feed Port No. 2—above longitudinal positions 1-4 on 5-inch mixer

Feed Port No. 3—above longitudinal positions 20-23 on 5-inch mixer

Using the above mixer arrangement, chewing gum base was made as follows.

A mixture of ground isobutylene-isoprene copolymer (2-7 mm particle size), calcium carbonate (<12 micron particle size), and terpene resin at a ratio of 8:21:17 was fed at a rate of 0.383 lbs/min. at the first feed inlet. In the second feed inlet, a powder blend of polyvinyl acetates glycerol monostearate, and hydrogenated soybean and vegetable oil at a ratio of 24:5:13 were fed at a rate of 0.35 lbs/min. In the third feed port, 6 parts of polyisobutylene at 130° C. at a feed rate of 0.05 lbs/min. and 6 parts of a 50/50 mixture of hydrogenated cottonseed oil/lecithin at 70° C. at a feed rate of 0.05 lbs/min. were added.

Overall, the production rate for the gum base was 50 pounds per hour. The gum base was manufactured using the following process conditions:

|  | 2-Inch Mixer | 5-Inch Mixer |
| --- | --- | --- |
| RPM | 310 | 387 |
| Initial Barrel Temp., °F. | 275-280 | 235-240 |
| Product Exit Temp., °C. | 162 | 120 |
| Average Residence Time | 2-6 min. | 30-40 min. |

About 40 pounds of gum base product was made at these conditions. The gum base had normal color, a smooth texture, and a homogeneous consistency, except for an occasional isolated undispersed particle.

Based on these and other runs, it was concluded that paddle mixing is an effective technique for manufacturing gum base on a continuous basis. The optimum process conditions, and the use of one or two mixers, vary depending on the specific gum base composition and the desired output rate.

EXAMPLE 5

Gum base was made on a continuous basis using a Japan Steel Works Incorporated model TEX30HSS32.5PW2V twin screw extruder set up in a co-rotating mode with extremely aggressive kneading elements and two feed inlets.

"Extremely aggressive kneading elements" means that most of the extruder shafts were covered with kneading elements as paddles. The arrangement was: 1/6 conveying elements at the first feed inlets ⅓ kneading elements, then 1/6 conveying elements at the second feed inlet and ⅓ kneading elements. This results in paddles covering 67% of the shafts.

A mixture of ground styrene - butadiene rubber (2-7 mm particle size), calcium carbonate (<12 micron particle size) and resin ester of glycerol abietate at a ratio of 9:46:18 was fed at a rate of 5.4 kg/hr at the first feed inlet. A mixture of resin ester of glycerol abietate, glycerol monostearate and microcrystalline wax at a ratio of 20:1:6 was fed at a rate of 2 kg/hr at the second feed inlet. The extruder was operated with temperature controls for seven heating zones and the die. The set point and actual temperatures were as follows:

|  | Zone | | | | | | | |
| --- | --- | --- | --- | --- | --- | --- | --- | --- |
|  | 1 | 2 | 3 | 4 | 5 | 6 | 7 | Die |
| Set Temperature | 130° C. | 130° C. | 130° C. | 130° C. | 100° C. | 100° C. | 100° C. | 80° C. |
| Actual Temperature | 129° C. | 131° C. | 122° C. | 130° C. | 100° C. | 100° C. | 100° C. | 139° C. |

The first feed inlet was between zones 1 and 2 and the second feed inlet was between zones 3 and 4. The extrudate exited at 118° C. The machine was run at 200 rpm, drawing 21 amps. The extrudate was a finished gum base that had no lumps.

EXAMPLE 6

This example was performed using a two-mixer arrangement with two 5-inch Teledyne Readco Continuous Mixer Compounders. The first Compounder was configured the same as in Table 3 of Example 2 the second Compounder was configured based on Table 1, shown previously. This configuration is also shown in FIG. 7.

The feed ports were arranged as follows:

Feed Port No. 1—above longitudinal positions 1-4 on first 5-inch mixer

Feed Port No. 2—above longitudinal positions 1-4 on second 5-inch mixer

Feed Port No. 3—above longitudinal positions 20-23 on second 5-inch mixer.

Using the above mixer arrangement, chewing gum base was made as follows:

A mixture of ground isobutylene-isoprene copolymer (2-7 mm particle size), calcium carbonate (<12 micron particle size), terpene resin, and powder color at a ratio of 11:18:17:1 was fed at a rate of 1.435 lbs/min. in the first feed inlet. In the second feed inlets a powder blend of polyvinyl acetate, glycerol monostearate, and hydrogenated soybean and vegetable oil at a ratio of 24:5:12 was fed at a rate of 1.264 lbs/min. In the third feed port, 6 parts of polyisobutylene at 95° C. at a feed rate of 0.181 lbs/min. and 6 parts of a 50/50 mixture of hydrogenated cottonseed oil/lecithin at 80° C. at a feed rate of 0.203 lbs/min. were added.

Overall, the production rate for the gum base was about 185 pounds per hour. The gum base was manufactured using the following process conditions:

|  | First 5-Inch Mixer | Second 5-Inch Mixer |
| --- | --- | --- |
| RPM | 250 | 400 |
| Initial Barrel Temp., °C. | 135 | 115 |
| Product Exit Temp., °C. | 190 | 115 |
| Average Residence Time | 20 min. | 10 min. |

About 200 pounds of gum base product was made. The gum base had normal color, no lumps, no unincorporate oil, but had a burnt off taste and odor.

EXAMPLE 7

This example was performed using a 2 mixer arrangement with two 5-inch Teledyne Readco Continuous Mixer Compounders. Both compounders were configured with the same paddle configuration that was shown in Table 1. Four feed ports were arranged as follows:

Feed Port No. 1—above longitudinal positions 1-4 on first 5-inch mixer

Feed Port No. 2—above longitudinal positions 20-23 on first 5-inch mixer

Feed Port No. 3—above longitudinal positions 1-4 on second 5-inch mixer

Feed Port No. 4—above longitudinal positions 20-23 on second 5-inch mixer.

Using the above mixer arrangement, chewing gum base was made as follows:

A mixture of ground isobutylene-isoprene copolymer (2-7 mm particle size), calcium carbonate (<12 micron particle size), and polyvinyl acetate at a ratio of 13:10:7 was fed at a rate of 0.75 lbs/min. in the first feed inlet. In the second feed inlets 15 parts of polyvinyl acetate was added at 0.375 lbs/min. In the third feed port, hydrogenated vegetable oil, hydrogenated soybean oils and glycerol monostearate at a ratio of 13:13:3 were added at a rate of 0.725 lbs/min. In the fourth feed port, 10 parts of partially hydrogenated vegetable oil at 0.25 lbs/min., and 16 parts of polyisobutylene at 130° C. at a rate of 0.40 lbs/min. were added.

Overall, the production rate for the gum base was 150 pounds per hour. The gum base was manufactured using the following process conditions:

|  | First 5-Inch Mixer | Second 5-Inch Mixer |
| --- | --- | --- |
| RPM | 373 | 374 |
| Initial Barrel Temp., °C. | 150-180 | 110 |
| Product Exit Temp., °C. | 165-191 | 111 |
| Average Residence Time | 20-25 min. | 12-15 min. |

About 400 pounds of gum base product was made. The gum base had normal color, no lumps, no unincorporated oil, and clean taste and odor.

EXAMPLE 8

This example was made using the same equipment, mixer arrangement, screw configuration, and feed ports as Example 7, except feed port No. 2 was closed off. The gum base was made as follows:

A mixture of ground isobutylene-isoprene copolymer (2-7 mm particle size), calcium carbonate (<12 micron particle size), terpene resin, and polyvinyl acetate at a ratio of 11:18:17:6 was fed at a rate of 1.30 lbs/min. in the first feed inlet. In the third feed inlet, a powder blend of polyvinyl acetate, glycerol monostearate, hydrogenated soybean oil and vegetable oil, and powdered color at a ratio of 18:5:12:1 was fed at a rate of 0.90 lbs/min. In the fourth feed inlet, 6 parts of polyisobutylene at 130° C. was added at a rate of 0.15 lbs/min., and 6 parts at a 50/50 blend of lecithin and hydrogenated cottonseed oil at 90° C. was added at a rate of 0.15 lbs/min.

Overall, the production rate for the gum base was 150 pounds per hour. The gum base was manufactured using the following process conditions.

|  | First 5-Inch Mixer | Second 5-Inch Mixer |
| --- | --- | --- |
| RPM | 300 | 373 |
| Initial Barrel Temp., °C. | 150-180 | 110 |
| Product Exit Temp., °C. | 172 | 113 |
| Average Residence Time | 20-25 min. | 12-15 min. |

About 400 pounds of gum base product was made. The gum base had normal color, no lumps, no unincorporated oil, and clean taste and odor.

Gum bases of Examples 7 and 8 were analyzed by Gel Permeation chromatography (GPC) and compared to the same formulation of base made by conventional batch processes. Analyses showed that the isobutyleneisoprene copolymer of Examples 7 and 8 was over-sheared and degraded. Sugar gum formulations were made to compare sensory attributes of bases from Examples 7 and 8 to base made by the conventional batch process. Tests showed that bases of Examples 7 and 8 gave a much softer texture than the bases from conventional batch process.

EXAMPLE 9

This example was performed using a two-mixer arrangement with two 5-inch Teledyne Readco Continuous Mixer Compounders. Both compounders were configured according to the following Table 4. The feed ports were the same as Example 8.

TABLE 4

| Mixer Configuration (Per Shaft) | | | | | |
|---|---|---|---|---|---|
| Longitudinal Position | Element | Rotational Position | Longitudinal Position | Element | Rotational Position |
| 1 | FC | 4 | 19 | FP | 3 |
| 2 | FC | 4 | 20 | FC | 3 |
| 3 | FC | 4 | 21 | FC | 3 |
| 4 | FC | 4 | 22 | FC | 3 |
| 5 | FC | 4 | 23 | FC | 3 |
| 6 | FC | 4 | 24 | FC | 3 |
| 7 | FC | 4 | 25 | FC | 3 |
| 8 | FC | 4 | 26 | FC | 3 |
| 9 | FP | 4 | 27 | FC | 3 |
| 10 | FP | 4 | 28 | FP | 2 |
| 11 | FP | 4 | 29 | FP | 2 |
| 12 | FP | 2 | 30 | FP | 4 |
| 13 | FP | 2 | 31 | FP | 4 |
| 14 | FP | 2 | 32 | FP | 4 |
| 15 | FP | 4 | 33 | FP | 2 |
| 16 | FP | 4 | 34 | FP | 2 |
| 17 | FP | 1 | 35 | FP | 4 |
| 18 | FP | 2 | 36 | RH | 4 |

Using the above mixer arrangement, chewing gum base was made as follows.

A mixture of ground isobutylene-isoprene copolymer (2-7 mm particle size), and calcium carbonate, terpene resins, and polyvinyl acetate at a ratio of 11:18:17:1 was added at a rate of 1.175 lbs/min. to feed inlet No. 1. To feed inlet No. 3 a powder blend of polyvinyl acetate, glycerol monostearate, hydrogenated soybean and vegetable oils, and powdered color at a ratio of 23:5:12:1 was fed at a rate of 1.025 lbs/min. To feed inlet No. 4, 6 parts of polyisobutylene at 130° C. was added at a rate of 0.15 lbs/min., and 6 parts of a 50/50 blend of lecithin and hydrogenated cottonseed oil at 90° C. was added at a rate of 0.15 lbs/min.

Overall, the production rate for the gum base was 150 pounds per hour. The gum base was manufactured using the following process conditions:

| | First 5-Inch Mixer | Second 5-Inch Mixer |
|---|---|---|
| RPM | 250 | 376 |
| Initial Barrel Temp., °C. | 150-180 | 110 |
| Product Exit Temp., °C. | 175 | 120 |
| Average Residence Time | 15-20 min. | 12-15 min. |

About 350 pounds of gum base was made. The gum base had normal color, no lumps, no unincorporated oil, and clean taste and odor. Analysis of the gum base by GPC indicated it is very similar to the same base formula made by a conventional batch process. Also, gum made from base of this example had sensory properties virtually the same as gum made with base made by conventional batch process.

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalents are intended to be embraced therein.

We claim:

1. A method of continuously making chewing gum base by sequential addition and mixing of different gum base ingredients, comprising the steps of:

providing a mixer which includes a plurality of paddles arranged on one or more shafts, the paddles covering at least about 40 percent of the one or more shafts;

continuously feeding about 5-95 weight percent elastomer to the mixer;

continuously feeding about 0-75 weight percent elastomer plasticizer to the mixer;

continuously feeding about 0.5-40 weight percent softeners/emulsifiers to the mixer;

continuously feeding about 1-65 weight percent fillers/texturizers to the mixer; and continuously blending the ingredients using the paddles until a homogeneous gum base is obtained.

2. The method of claim 1, wherein the paddles are arranged on two rotating shafts in the mixer.

3. The method of claim 2, wherein each paddle includes two concave mixing surfaces intersecting at two lines.

4. The method of claim 2, wherein the paddles cover at least about 50 percent of the shaft.

5. The method of claim 2, wherein the paddles cover at least about 60 percent of the shaft.

6. The method of claim 1, wherein the paddles are arranged on two co-rotating shafts in the mixer.

7. The method of claim 6, wherein the mixer further comprises a barrel, the barrel including an inner surface defining a barrel space, the rotating shafts and paddles being located in the barrel space.

8. The method of claim 7, wherein the inner surface has a shape of two intersecting cylinders.

9. The method of claim 1, wherein the paddles have a height, a width, and a ratio of height to width of more than 1.5 to 1.

10. The method of claim 9, wherein the ratio of height to width is more than 2 to 1.

11. The method of claim 1, wherein the elastomer comprises a synthetic material selected from the group consisting of polyisobutylene, isobutylene-isoprene copolymer, styrene-butadiene copolymer, polyvinyl acetate, vinyl acetate-vinyl laurate copolymer, and combinations thereof.

12. The method of claim 1, wherein the elastomer comprises a natural material selected from the group consisting of latex, guayule, natural gums, and combinations thereof.

13. The method of claim 1, wherein the elastomer plasticizer is present and comprises a material selected from the group consisting of natural rosin esters and synthetic terpene resins.

14. The method of claim 1, wherein the softeners/emulsifiers comprise a material selected from the group consisting of tallow, hydrogenated tallow, hydrogenated and partially hydrogenated vegetable oils, cocoa butter, glycerol monostearate, glycerol triacetate, lecithin, glycerides, fatty acids, and combinations thereof.

15. The method of claim 1, wherein the fillers/texturizers comprise a material selected from the group consisting of carbonates, limestone, silicates, clay, alumina, talc, titanium oxides phosphates of calcium, cellulose materials, and combinations thereof.

16. A method of continuously making chewing gum base by sequential addition and mixing of different gum base ingredients, comprising the steps of:

providing a paddle mixer system having a mixer system length, a maximum paddle diameter, and a ratio of mixer system length to maximum paddle diameter of at least about 4:1;

selectively feeding about 5–95 weight percent elastomer, about 0–75 weight percent elastomer plasticizer, about 0.5–40 weight percent softener/emulsifier and about 1–65 weight percent filler to the paddle mixer system, at two or more locations along the mixer system length; and continuously blending the ingredients using the paddle mixer system until a homogeneous gum base is obtained;

wherein the paddle mixer system comprises a plurality of paddles, each paddle including two concave mixing surfaces intersecting at two lines.

17. The method of claim 16, wherein at least some of the elastomer and filler are selectively fed at a first of the two locations.

18. The method of claim 16, wherein at least some of the softener/emulsifier is selectively fed at a second of the two locations.

19. The method of claim 16, wherein the ratio of mixer system length to maximum paddle diameter is at least about 7:1.

20. The method of claim 16, wherein the paddle mixer system comprises only one paddle mixer apparatus.

21. The method of claim 16, wherein the paddle mixer system comprises at least two paddle mixer apparatus in series.

22. The method of claim 16, wherein the elastomer, elastomer plasticizer, softener/emulsifier and filler are selectively fed at three or more locations along the mixer system length.

23. The method of claim 21, wherein the elastomer, elastomer plasticizer, softener/emulsifier and filler are selectively fed at three or more locations along the two paddle mixer apparatus.

24. A method of continuously making chewing gum base by sequential addition and mixing of different gum base ingredients, comprising the steps of:

providing a paddle mixer including a plurality of paddles arranged and supported on two parallel shafts, each of the shafts supporting an identical arrangement of paddles, each paddle including two concave mixing surfaces intersecting at two lines;

continuously feeding about 5–95 weight percent elastomer to the paddle mixer;

continuously feeding about 0–75 weight percent elastomer plasticizer to the paddle mixer;

continuously feeding about 0.5–40 weight percent softeners/emulsifiers to the paddle mixer;

continuously feeding about 1–65 weight percent fillers/texturizers to the paddle mixer; and continuously blending the ingredients in the paddle mixer to produce a gum base.

25. The method of claim 24, wherein the paddles are selectively arranged at different relative rotational positions on the shafts.

26. The method of claim 24, wherein the two shafts rotate on the same direction during mixing.

27. The method of claim 24, wherein the paddles comprise a major portion of flat paddles.

28. The method of claim 24, wherein the paddles comprise a minor portion of helical paddles.

29. The method of claim 24, further comprising a plurality of feed conveying elements arranged and mounted on the parallel shafts.

* * * * *